United States Patent
Olive

(10) Patent No.: US 11,728,631 B1
(45) Date of Patent: Aug. 15, 2023

(54) TEMPLATE-MARKING TOOL FOR INSTALLING CONDUIT

(71) Applicant: Michael Olive, Bronx, NY (US)

(72) Inventor: Michael Olive, Bronx, NY (US)

( * ) Notice: Subject to any disclaimer, the term of this patent is extended or adjusted under 35 U.S.C. 154(b) by 169 days.

(21) Appl. No.: 17/404,040

(22) Filed: Aug. 17, 2021

(51) Int. Cl.
*G01B 5/25* (2006.01)
*H02G 1/08* (2006.01)
*B23B 49/02* (2006.01)

(52) U.S. Cl.
CPC ............... *H02G 1/08* (2013.01); *B23B 49/02* (2013.01); *G01B 5/25* (2013.01)

(58) Field of Classification Search
CPC ............ G01B 5/25; B23B 49/02; H02G 1/08
USPC ................................... 33/483, 494, 528, 562
See application file for complete search history.

(56) References Cited

U.S. PATENT DOCUMENTS

| | | | | |
|---|---|---|---|---|
| 4,584,780 A | * | 4/1986 | Pressey | B43L 13/206 D10/64 |
| 5,222,303 A | * | 6/1993 | Jardine | G01B 3/02 33/528 |
| 5,848,478 A | * | 12/1998 | Duncan | G01B 3/14 33/529 |
| 6,166,329 A | * | 12/2000 | Oliver | H02G 3/14 174/67 |
| 6,220,317 B1 | | 4/2001 | Martin | |
| 6,327,786 B1 | * | 12/2001 | Felix | B25H 7/00 33/474 |
| 6,523,272 B1 | * | 2/2003 | Morales | E04F 21/0076 33/526 |
| D475,307 S | | 6/2003 | Grendahl | |
| 6,698,103 B2 | * | 3/2004 | Nortier | E03D 5/10 33/528 |
| 6,750,398 B1 | * | 6/2004 | Richardson | H02G 3/14 33/528 |
| 6,907,674 B2 | | 6/2005 | Grendahl | |
| 7,398,601 B2 | * | 7/2008 | Morrell | B25H 7/00 33/429 |
| 7,891,108 B1 | | 2/2011 | Cordobes | |
| 8,458,921 B2 | * | 6/2013 | Hernandez | G01B 3/004 33/679.1 |
| 8,707,574 B2 | * | 4/2014 | Goldrick | E04F 21/26 33/563 |
| 10,668,582 B1 | | 6/2020 | Rogers | |
| 2004/0003507 A1 | * | 1/2004 | Jordan | H02G 3/00 33/566 |

(Continued)

FOREIGN PATENT DOCUMENTS

GB        2469655        10/2010

*Primary Examiner* — George B Bennett
(74) *Attorney, Agent, or Firm* — Kyle A. Fletcher, Esq.

(57) ABSTRACT

The template-marking tool for installing conduit may comprise a template for locating the center of a new conduit aperture on a junction box. The template may be pressed against a wall of the junction box and may slide along the junction box until a first mark shows at one of a plurality of alignment slots. A second mark may be made on the junction box at one of a plurality of centering apertures. The new conduit aperture may be drilled at the second mark to create an aperture for accepting a conduit connector that an individual conduit will couple to. A plurality of indicia may be adapted to guide a user in selecting one of the plurality of centering apertures on the template based upon the size of a conduit support strut and the diameter of the individual conduit.

20 Claims, 6 Drawing Sheets

(56) References Cited

U.S. PATENT DOCUMENTS

| | | |
|---|---|---|
| 2006/0191150 A1 | 8/2006 | Sikora |
| 2009/0260244 A1* | 10/2009 | Carbone, Jr. ........ G01B 3/1084 |
| | | 33/527 |
| 2018/0117683 A1 | 5/2018 | Rothera |
| 2022/0193792 A1* | 6/2022 | Harvey .................... B25H 7/02 |

* cited by examiner

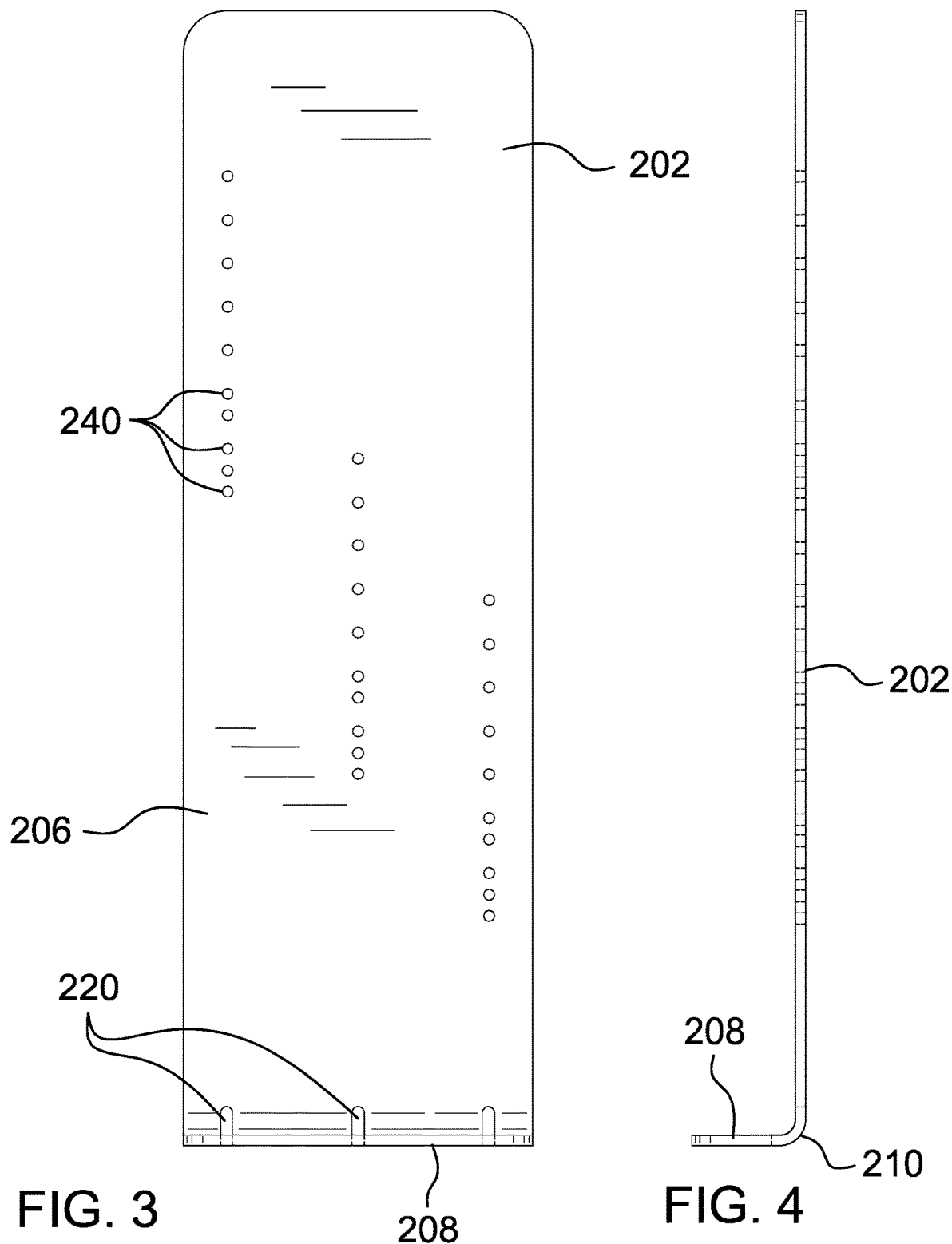

TEMPLATE-MARKING TOOL FOR INSTALLING CONDUIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of electrician's tools, more specifically, a template-marking tool for installing conduit.

SUMMARY OF INVENTION

The template-marking tool for installing conduit may comprise a template for locating the center of a new conduit aperture on a junction box. The template may be pressed against a wall of the junction box and may slide along the junction box until a first mark shows at one of a plurality of alignment slots. A second mark may be made on the junction box at one of a plurality of centering apertures. The new conduit aperture may be drilled at the second mark to create an aperture for accepting a conduit connector that an individual conduit will couple to. A plurality of indicia may be adapted to guide a user in selecting one of the plurality of centering apertures on the template based upon the size of a conduit support strut and the diameter of the individual conduit.

An object of the invention is to locate the center of a new conduit aperture to be drilled into a junction box.

Another object of the invention is to provide a plurality of paired marking sets and alignment slots where each pairing is associated with the dimensions of a standard size conduit support strut.

A further object of the invention is to provide a plurality of centering apertures within each marking set where each centering aperture is associated with the diameter of a standard size of conduit.

Yet another object of the invention is to provide indicia to aid in the selection of a marking set and a centering aperture based upon the dimensions of the conduit support strut and the diameter of the conduit.

These together with additional objects, features and advantages of the template-marking tool for installing conduit will be readily apparent to those of ordinary skill in the art upon reading the following detailed description of the presently preferred, but nonetheless illustrative, embodiments when taken in conjunction with the accompanying drawings.

In this respect, before explaining the current embodiments of the template-marking tool for installing conduit in detail, it is to be understood that the template-marking tool for installing conduit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the template-marking tool for installing conduit.

It is therefore important that the claims be regarded as including such equivalent construction insofar as they do not depart from the spirit and scope of the template-marking tool for installing conduit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 3 is a rear view of an embodiment of the disclosure.

FIG. 4 is a left side view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
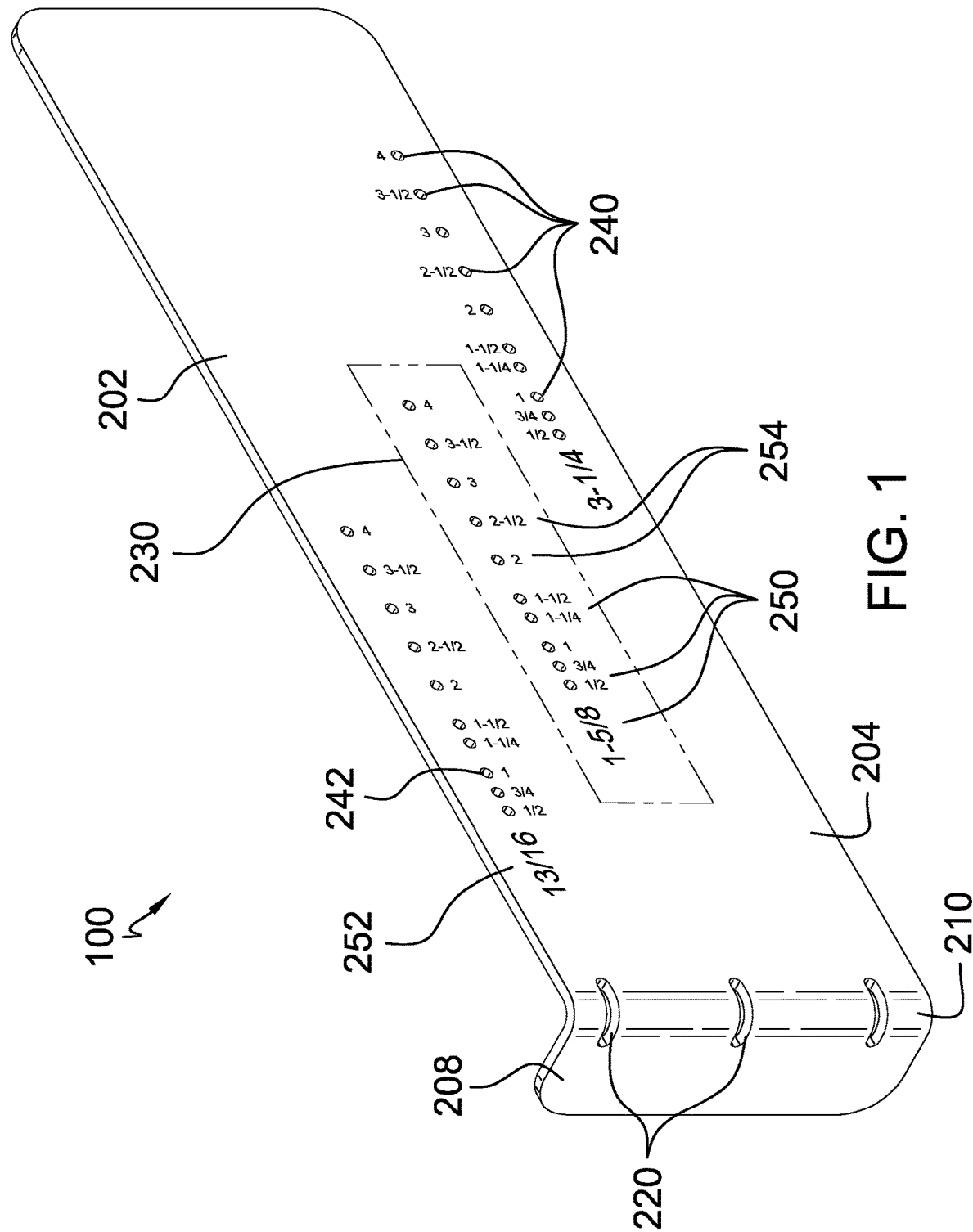
FIG. 1 is an isometric view of an embodiment of the disclosure.
Figure 2:
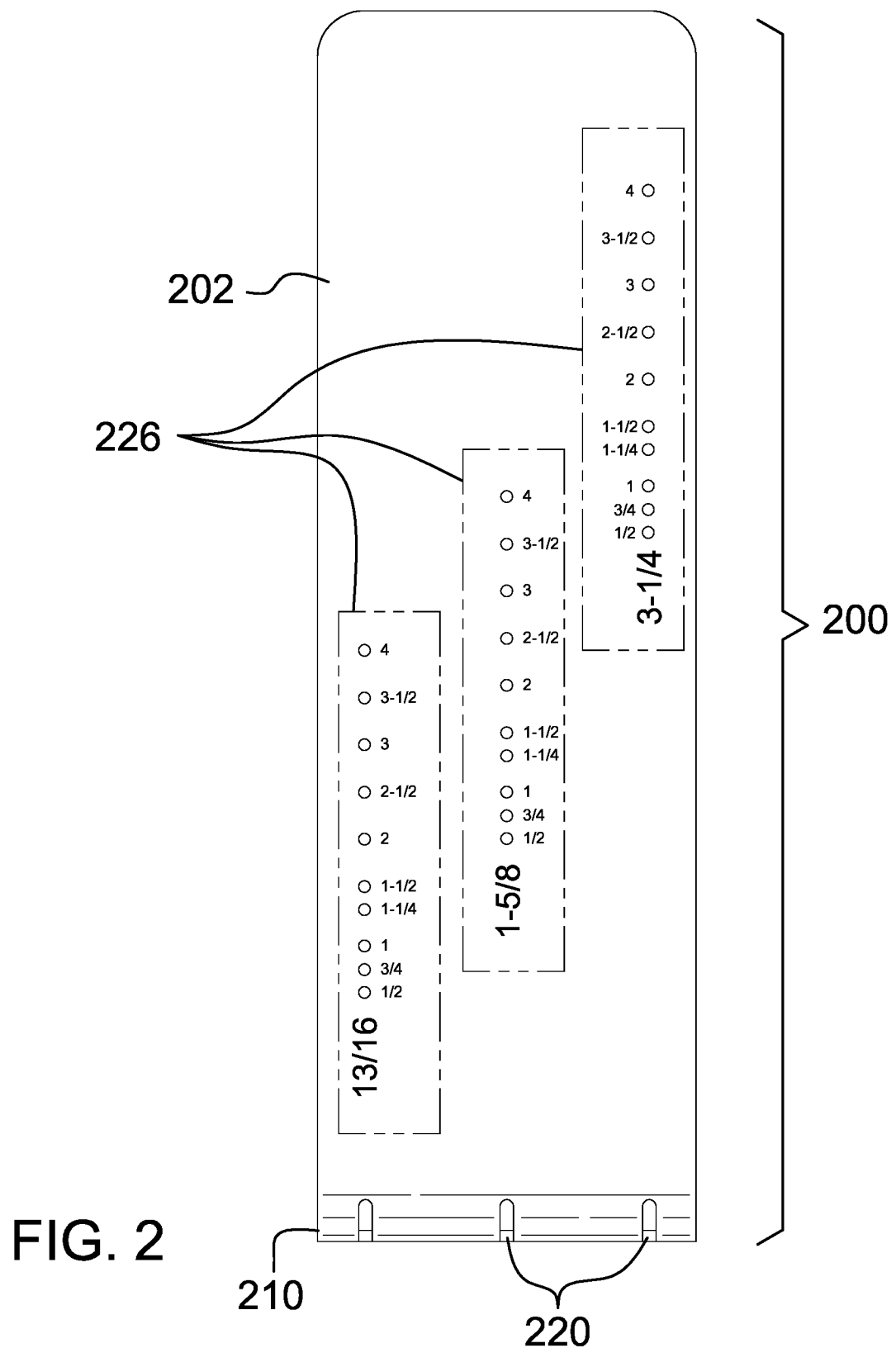
FIG. 2 is a front view of an embodiment of the disclosure.
Figure 5:
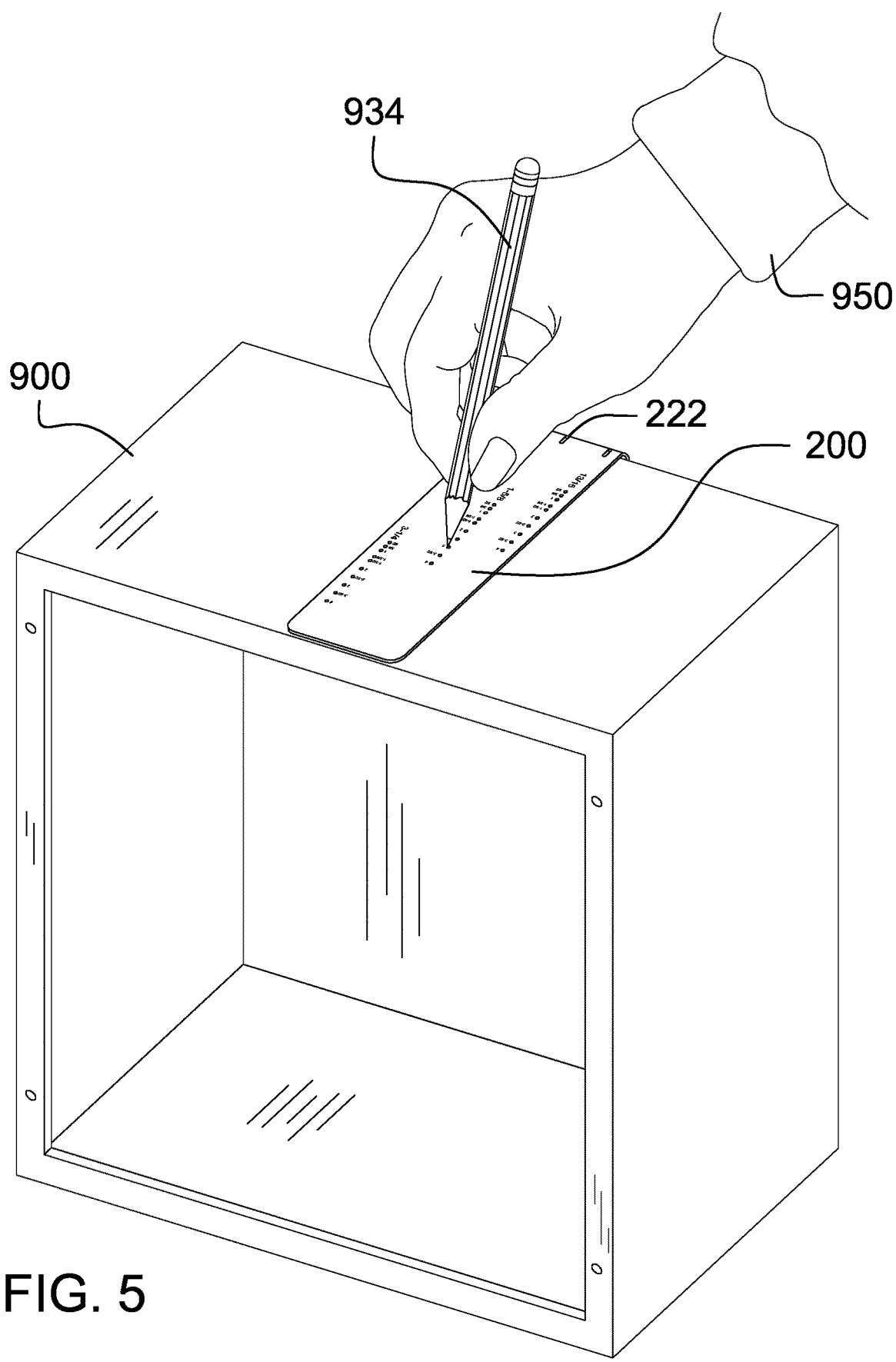
FIG. 5 is an in-use view of an embodiment of the disclosure illustrating use of the template to mark the center of an aperture on a junction box.
Figure 6:
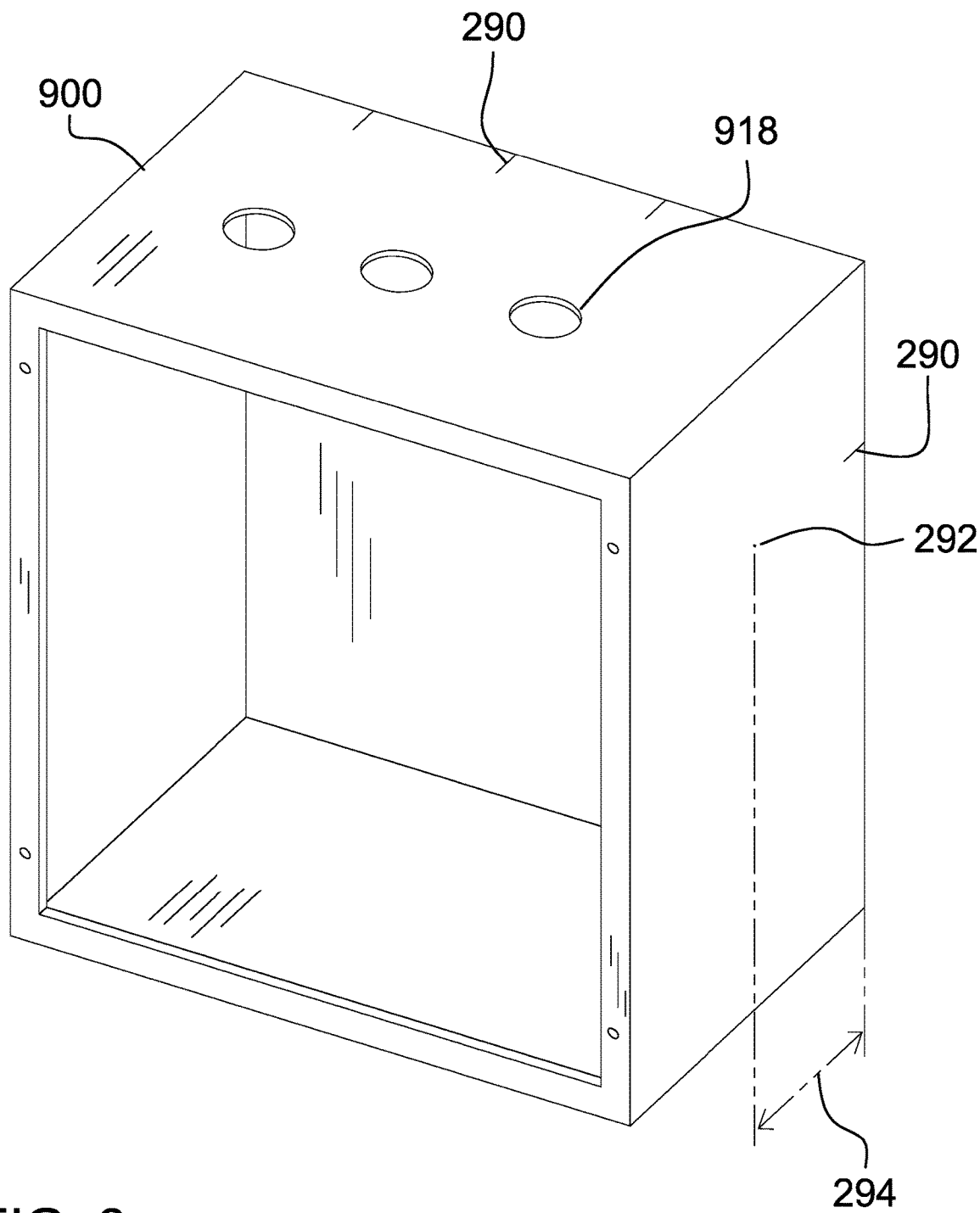
FIG. 6 is an in-use view of an embodiment of the disclosure illustrating the junction box with some conduit apertures drilled.
Figure 7:
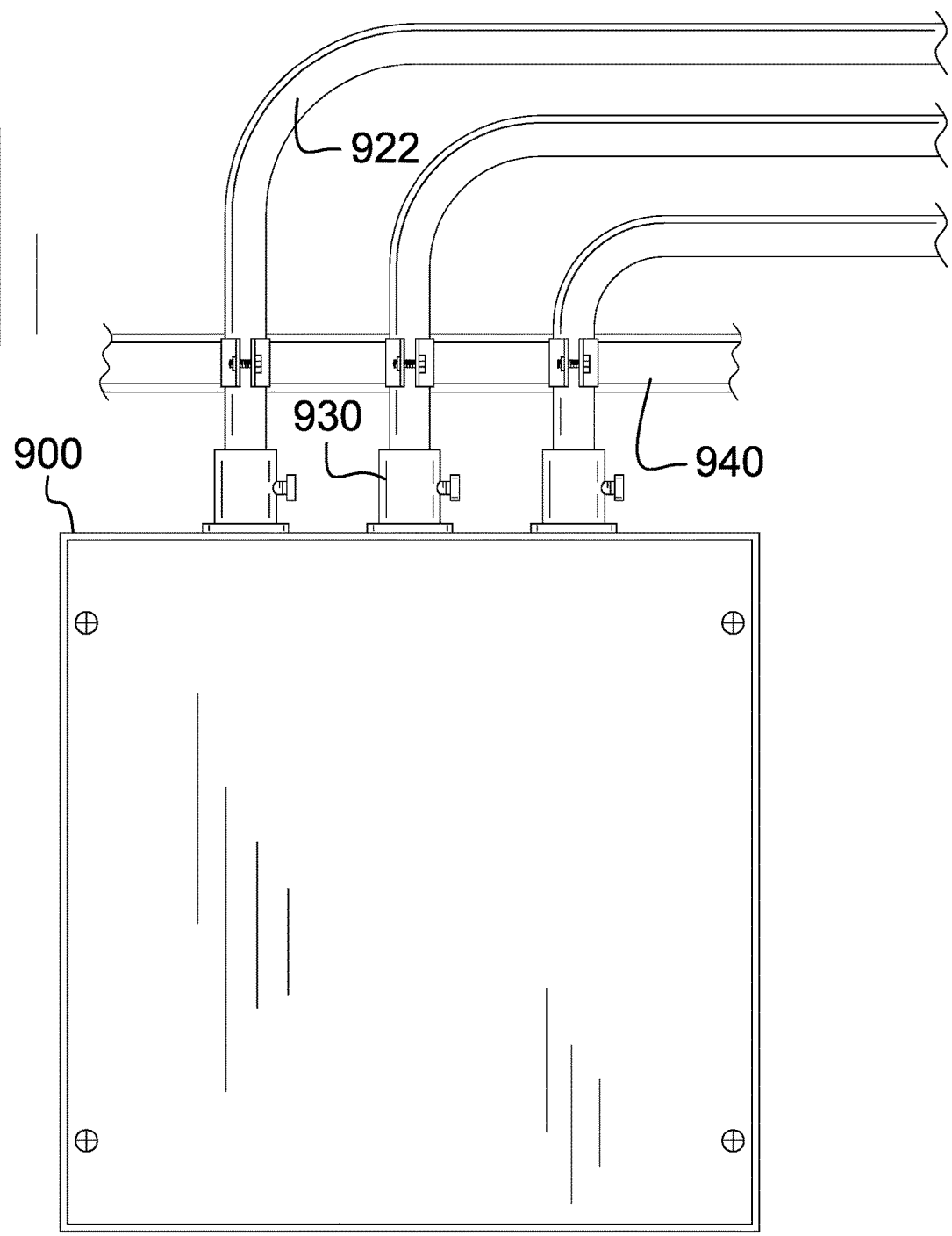
FIG. 7 is an in-use view of an embodiment of the disclosure illustrating the relationship between the junction box, the conduit support strut, the conduit connectors, and the conduit.

Detailed reference will now be made to a first potential embodiment of the disclosure, which is illustrated in FIGS. 1 through 7.

The template-marking tool for installing conduit 100 (hereinafter invention) comprises a template 200 for locating the center of a new conduit aperture 918 on a junction box 900. The template 200 may be pressed against a top wall, a side wall, or a bottom wall of the junction box 900. The template 200 may slide along the junction box 900 while remaining in contact with a building wall 932 until a first mark 290 that is aligned with an individual conduit 922 shows at one of a plurality of alignment slots 220, thus aligning the new conduit aperture 918 with the individual conduit 922 in a transverse direction. A second mark 292 may be made on the junction box 900 at one of a plurality of centering apertures 240 to establish a drill distance 294 from the building wall 932. The new conduit aperture 918 may be drilled at the second mark 292 to create an aperture for accepting a conduit connector 930 that the individual conduit 922 will couple to. The invention 100 may be operable to correctly place the second mark 292 to account for the diameter of the individual conduit 922. A plurality of indicia 250 may be adapted to guide a user 950 in selecting one of the plurality of centering apertures 240 on the template 200 based upon the size of a conduit support strut 940 and the diameter of the individual conduit 922.

The template 200 may be a guide for locating the center of a hole. Specifically, the hole may be a new conduit aperture 918 to be drilled into a junction box 900 such that an individual conduit 922 may route wiring of an electrical circuit into the junction box 900, typically for electrically coupling the wiring to other wiring routed to the junction box 900. The template 200 may be operable to adjust for a first offset between the individual conduit 922 and the building wall 932 due to the use of the conduit support strut 940 and for a second offset due the radius of the individual conduit 922.

The template 200 may comprise a face plate 202 and a lip 208. The face plate 202 that may be a flat plate extending longitudinally along the junction box 900 and oriented during use to be perpendicular to the building wall 932 that the junction box 900 is attached to. The face plate 202 may comprise a topside 204 and an underside 206. The topside 204 may comprise the plurality of indicia 250. The underside 206 may be adjacent to the junction box 900 during use of the template 200.

The lip 208 may be coupled to the face plate 202 and oriented to be perpendicular to the face plate 202, extending in the direction of the underside 206. The underside 206 of the face plate 202 may be placed in contact with the top wall, one of the side walls, or the bottom wall of the junction box 900. The lip 208 may wrap around an edge of the junction box 900 and may extend behind the junction box 900. A corner 210 of the template 200 where the face plate 202 meets the lip 208 may align with the edge of the junction box 900 and may lie parallel to the building wall 932 during use.

A plurality of marking sets 226 may correspond to standard sizes of the conduit support struts 940. Selection of an individual marking set 230 from the plurality of marking sets 226 may determine the first offset that contributes to the drill distance 294 from the building wall 932 based upon the dimensions of the conduit support strut 940 that is associated with the individual marking set 230.

The individual marking set 230 may correspond to one of the standard sizes of the conduit support struts 940. The individual marking set 230 may comprise the plurality of centering apertures 240 and the plurality of indicia 250. The plurality of centering apertures 240 may be a plurality of holes that pass perpendicularly through the template 200 from the topside 204 to the underside 206. The plurality of centering apertures 240 may be aligned along an imaginary line extending perpendicularly from the building wall 932. An individual centering aperture 242 may be operable as a guide for marking the second mark 292 by passing the tip of a writing instrument 934 through the individual centering aperture 242 to mark on the junction box 900. Each of the individual centering apertures 242 corresponds to a diameter of a standard size of conduit. The individual centering aperture 242 that is closest to the building wall 932 corresponds to the smallest diameter of the conduit. The individual centering aperture 242 may be located such that the distance from the building wall 932 to the individual centering aperture 242 is the drill distance 294 for positioning the center of the new conduit aperture 918, taking into account the first offset which is determined by the dimensions of the conduit support strut 940 and the second offset which is determined by the radius of the individual conduit 922.

The plurality of indicia 250 may be markings on the topside 204 of the template 200 such that the plurality of indicia 250 are visible during use of the template 200. The plurality of indicia 250 may be adapted to guide the user 950 in selecting the individual marking set 230 and the individual centering aperture 242 within the individual marking set 230 based upon the dimensions of the conduit support strut 940 and the diameter of the conduit being routed to the junction box 900. The plurality of indicia 250 may comprise a strut size marking 252. The strut size marking 252 may indicate the size of the conduit support strut 940 for which the individual marking set 230 correctly compensates the first offset. The plurality of indicia 250 may comprise a plurality of conduit size markings 254. The plurality of conduit size markings 254 may be adjacent each of the individual centering apertures 242 in the individual marking set 230. The plurality of conduit size markings 254 may indicate, for each of the plurality of centering apertures 240 individually, the diameter of the conduit for which the individual centering aperture 242 correctly compensates the second offset. As non-limiting examples, the plurality of indicia 250 may be printed, silk-screened, stamped, embossed, painted, or combinations thereof.

The plurality of alignment slots 220 may be operable to align the template 200 with the conduit in a transverse direction. Each of the plurality of alignment slots 220 may correspond to one of the plurality of marking sets 226. The plurality of alignment slots 220 may be adapted to adjust the drill distance 294 based upon the dimensions of the conduit support strut 940 when the user 950 selects one of the plurality of alignment slots 220 for alignment with the first mark 290.

The template 200 may be made from a rigid durable material. As non-limiting examples, the template 200 may be made of stainless steel, tool steel, aluminum, plastic, composite resin, or combinations thereof.

In a preferred embodiment, the template 200 may comprise three marking sets and three alignment slots. The three marking sets and the three alignment slots may correspond to standard strut sizes of $13/16$, $1 5/8$, and $3 1/4$.

In a preferred embodiment, each of the individual marking sets 230 may comprise at least ten centering apertures. The at least ten centering apertures may correspond to standard conduit diameters of ½ inch, ¾ inch, 1 inch, 1¼ inches, 1½ inches, 2 inches, 2½ inches, 3 inches, 3½ inches, and 4 inches.

In use, the user 950 may make a first mark 290 on the junction box 900. The first mark 290 may be located at the rear of the junction box 900 on the outside of a top wall, a left side wall, a right side wall, or a bottom wall of the junction box 900 and may align with the individual conduit 922 that is being routed into the junction box 900. The user 950 may place the template 200 against the same side of the junction box 900 that bears the first mark 290 with the lip 208 behind the junction box 900 and the underside 206 of the face plate 202 against the junction box 900.

The user 950 may select an individual marking set 230 based upon the dimensions of the conduit support strut 940 that supports the individual conduit 922. As a non-limiting example, if the individual conduit 922 is supported by a 1⅝ inch strut, the user 950 may select the individual marking set 230 that corresponds with 1⅝ inch struts according to the strut size marking 252 of the individual marking set 230. The user 950 may slide the template 200 along the junction box 900 until the first mark 290 shows through an individual alignment slot 222 that is associated with the individual marking set 230 that was selected.

The user 950 may select an individual centering aperture 242 from the plurality of centering apertures 240 in the individual marking set 230 based upon the diameter of the individual conduit 922. As a non-limiting example, if the individual conduit 922 is a 1⅛ inch diameter conduit, then the user 950 may select the individual centering aperture 242 that corresponds with 1⅛ inch conduit. The user 950 may make a second mark 292 on the junction box 900 using the individual centering aperture 242 as a guide. The second mark 292 may be the center of the new conduit aperture 918 to be drilled into the junction box 900. The user 950 may drill at the second mark 292 using a bit that is sized for both the conduit and the conduit connector 930. As a non-limiting example, a 1 inch conduit may require use of a 1⅜ inch hole saw. With the new conduit aperture 918 drilled, the conduit connector 930 may be coupled to the junction box 900 at the new conduit aperture 918 and the individual conduit 922 may be routed to the junction box 900 to couple with the conduit connector 930.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "align" may refer to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" may be an opening in a surface. Aperture may be synonymous with hole, slit, crack, gap, slot, or opening.

As used in this disclosure, the word "correspond" may indicate that a first object is in some manner linked to a second object in a one to one relationship or that one or more properties shared by two or more objects match, agree, or align within acceptable manufacturing tolerances.

As used herein, the words "couple", "couples", "coupled" or "coupling", may refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used herein, the word "durable" may refer to a material's ability to withstand wear, pressure, impact, heat, cold, sun exposure, and other forms of potentially damaging conditions without suffering any significant deterioration of quality or value.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, the term "indicia" may refer to a set of markings that identify a sentiment.

As used herein, the word "longitudinal" or "longitudinally" may refer to a lengthwise or longest direction.

As used herein, the words "printed", "marked", and "marking" may refer to a mark that has been made on an object. The process of making the mark may involve printing, lithography, thermal transfer, painting, embossing, molding, burning, silk-screening, drawing, etching, engraving, stamping, spraying of pigments, or other processes which result in the controlled change of coloration and/or shape of a surface.

As used in this disclosure, a "radius" may refer to a line segment that: 1) connects the center of a circle to the circumference of the circle; or, 2) connects the center of a sphere to the surface of the sphere; or, 3) is one half the span of the diameter of an object.

As used herein, "rigid" may refer to an object or material which is inflexible. A rigid object may break if force is applied to the object.

As used herein, "transverse direction" may refer to any direction that is perpendicular to the depth of a junction box. "Transverse distance" may refer to a distance measured along a transverse direction. As non-limiting examples, distances measured left and right along a top or bottom of a junction box and distances measured up and down along a side a junction box are transverse distances. As a non-limiting example, a transverse distance may be measured from a corner of a junction box to locate a drill hole for alignment with a conduit.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A template-marking tool for installing conduit comprising:
a template for locating the center of a new conduit aperture on a junction box;

wherein the template is pressed against a top wall, a side wall, or a bottom wall of the junction box;

wherein the template slides along the junction box while remaining in contact with a building wall until a first mark that is aligned with an individual conduit shows at one of a plurality of alignment slots, thus aligning the new conduit aperture with the individual conduit in a transverse direction;

wherein a second mark is made on the junction box at one of a plurality of centering apertures to establish a drill distance from the building wall;

wherein the new conduit aperture is drilled at the second mark to create an aperture for accepting a conduit connector that the individual conduit will couple to;

wherein the template is operable to correctly place the second mark to account for dimensions of a conduit support struct and the diameter of the individual conduit;

wherein a plurality of indicia are adapted to guide a user in selecting one of the plurality of centering apertures on the template based upon the size of a conduit support strut and the diameter of the individual conduit.

2. The template-marking tool for installing conduit according to claim 1
wherein the template is a guide for locating the center of a hole;
wherein the template is operable to adjust for a first offset between the individual conduit and the building wall associated with the use of the conduit support strut and for a second offset associated with the radius of the individual conduit.

3. The template-marking tool for installing conduit according to claim 2
wherein the template comprises a face plate and a lip;
wherein the face plate that is a flat plate extending longitudinally along the junction box and oriented during use to be perpendicular to the building wall that the junction box is attached to.

4. The template-marking tool for installing conduit according to claim 3
wherein the face plate comprises a topside and an underside;
wherein the topside comprises the plurality of indicia;
wherein the underside is adjacent to the junction box during use of the template.

5. The template-marking tool for installing conduit according to claim 4
wherein the lip is coupled to the face plate and oriented to be perpendicular to the face plate, extending in the direction of the underside;
wherein the underside of the face plate is placed in contact with the top wall, one of the side walls, or the bottom wall of the junction box;
wherein the lip wraps around an edge of the junction box and extends behind the junction box;
wherein a corner of the template where the face plate meets the lip aligns with the edge of the junction box and lies parallel to the building wall during use.

6. The template-marking tool for installing conduit according to claim 5
wherein a plurality of marking sets correspond to standard sizes of the conduit support struts;
wherein selection of an individual marking set from the plurality of marking sets determines the first offset that contributes to the drill distance from the building wall based upon the dimensions of the conduit support strut that is associated with the individual marking set.

7. The template-marking tool for installing conduit according to claim 6
wherein the individual marking set corresponds to one of the standard sizes of the conduit support struts;
wherein the individual marking set comprises the plurality of centering apertures and the plurality of indicia;
wherein the plurality of centering apertures are a plurality of holes that pass perpendicularly through the template from the topside to the underside;
wherein the plurality of centering apertures are aligned along an imaginary line extending perpendicularly from the building wall.

8. The template-marking tool for installing conduit according to claim 7
wherein an individual centering aperture is operable as a guide for marking the second mark by passing the tip of a writing instrument through the individual centering aperture to mark on the junction box.

9. The template-marking tool for installing conduit according to claim 8
wherein each of the individual centering apertures corresponds to a diameter of a standard size of conduit;
wherein the individual centering aperture that is closest to the building wall corresponds to the smallest diameter of the conduit;
wherein the individual centering aperture is located such that the distance from the building wall to the individual centering aperture is the drill distance for positioning the center of the new conduit aperture, taking into account the first offset which is determined by the dimensions of the conduit support strut and the second offset which is determined by the radius of the individual conduit.

10. The template-marking tool for installing conduit according to claim 9
wherein the plurality of indicia are markings on the topside of the template such that the plurality of indicia are visible during use of the template;
wherein the plurality of indicia are adapted to guide the user in selecting the individual marking set and the individual centering aperture within the individual marking set based upon the dimensions of the conduit support strut and the diameter of the conduit being routed to the junction box.

11. The template-marking tool for installing conduit according to claim 10
wherein the plurality of indicia comprise a strut size marking;
wherein the strut size marking indicates the size of the conduit support strut for which the individual marking set correctly compensates the first offset.

12. The template-marking tool for installing conduit according to claim 11
wherein the plurality of indicia comprise a plurality of conduit size markings;
wherein the plurality of conduit size markings are adjacent each of the individual centering apertures in the individual marking set;
wherein the plurality of conduit size markings indicate, for each of the plurality of centering apertures individually, the diameter of the conduit for which the individual centering aperture correctly compensates the second offset.

13. The template-marking tool for installing conduit according to claim 12
wherein the plurality of indicia are printed, silk-screened, stamped, embossed, painted, or combinations thereof.

14. The template-marking tool for installing conduit according to claim 12
- wherein the plurality of alignment slots are operable to align the template with the conduit in a transverse direction;
- wherein each of the plurality of alignment slots correspond to one of the plurality of marking sets;
- wherein the plurality of alignment slots are adapted to adjust the drill distance based upon the dimensions of the conduit support strut when the user selects one of the plurality of alignment slots for alignment with the first mark.

15. The template-marking tool for installing conduit according to claim 14
- wherein the template is made from a rigid durable material.

16. The template-marking tool for installing conduit according to claim 15
- wherein the template is made of stainless steel, tool steel, aluminum, plastic, composite resin, or combinations thereof.

17. The template-marking tool for installing conduit according to claim 14
- wherein the template comprises three marking sets and three alignment slots.

18. The template-marking tool for installing conduit according to claim 17
- wherein the three marking sets and the three alignment slots correspond to standard strut sizes of 13/16, 1⅝, and 3¼.

19. The template-marking tool for installing conduit according to claim 18
- wherein each of the individual marking sets comprise at least ten centering apertures.

20. The template-marking tool for installing conduit according to claim 19
- wherein the at least ten centering apertures correspond to standard conduit diameters of ½ inch, ¾ inch, 1 inch, 1¼ inches, 1½ inches, 2 inches, 2½ inches, 3 inches, 3½ inches, and 4 inches.

* * * * *